(12) United States Patent
Tugurlan et al.

(10) Patent No.: US 9,441,889 B2
(45) Date of Patent: Sep. 13, 2016

(54) THERMAL ENERGY STORAGE DEVICES, SYSTEMS, AND THERMAL ENERGY STORAGE DEVICE MONITORING METHODS

(75) Inventors: Maria C. Tugurlan, Pasco, WA (US); Francis K. Tuffner, Richland, WA (US); David P. Chassin, Pasco, WA (US)

(73) Assignee: Battelle Memorial Institute, Richland, WA (US)

( * ) Notice: Subject to any disclaimer, the term of this patent is extended or adjusted under 35 U.S.C. 154(b) by 843 days.

(21) Appl. No.: 13/247,926

(22) Filed: Sep. 28, 2011

(65) Prior Publication Data

US 2013/0077944 A1     Mar. 28, 2013

(51) Int. Cl.
| | |
|---|---|
| G01K 3/00 | (2006.01) |
| G01K 7/00 | (2006.01) |
| F28D 20/00 | (2006.01) |
| F28F 27/00 | (2006.01) |
| F24H 1/20 | (2006.01) |
| F24H 9/20 | (2006.01) |

(52) U.S. Cl.
CPC ............. *F28D 20/0039* (2013.01); *F24H 1/20* (2013.01); *F24H 9/2007* (2013.01); *F28F 27/00* (2013.01); *Y02E 60/142* (2013.01)

(58) Field of Classification Search
USPC ................................ 374/112, 166, 110, 137
See application file for complete search history.

(56) References Cited

U.S. PATENT DOCUMENTS

| | | | |
|---|---|---|---|
| 6,246,831 B1* | 6/2001 | Seitz et al. ...................... | 392/486 |
| 7,004,625 B2* | 2/2006 | Egidio ............................ | 374/166 |
| 2002/0011105 A1* | 1/2002 | Snelling et al. ................. | 73/295 |
| 2009/0007627 A1* | 1/2009 | Perl et al. ........................ | 73/1.73 |
| 2009/0277846 A1* | 11/2009 | Koopmans .......... | B01F 13/0222 210/758 |
| 2011/0081134 A1* | 4/2011 | Salyer ........................... | 392/308 |
| 2012/0018116 A1* | 1/2012 | Mathur et al. .................. | 165/10 |
| 2012/0118554 A1* | 5/2012 | Mathur et al. ................. | 165/287 |
| 2014/0321839 A1* | 10/2014 | Armstrong ..................... | 392/463 |

FOREIGN PATENT DOCUMENTS

| | | |
|---|---|---|
| CA | 2847515 | 2/2015 |
| DE | 195 43 761 | 5/1997 |
| DE | 10 2008 043030 | 4/2010 |
| EP | 2 336 700 | 6/2011 |
| WO | WO 00/63624 | 10/2000 |
| WO | PCT/US2012/049059 | 1/2013 |
| WO | PCT/US2012/049059 | 4/2014 |

OTHER PUBLICATIONS

Translation of DE 102008043030 to Siemens (Apr. 29, 2010).*
Translation of DE 19543761 to Brieger (May 28, 1997).*
Thermocline; http://en.wikipedia.org/wiki/Thermocline; Last Modified May 6, 2011; 3 pp.

* cited by examiner

*Primary Examiner* — Mirellys Jagan
(74) *Attorney, Agent, or Firm* — Wells St. John P.S.

(57) ABSTRACT

Thermal energy storage devices, systems, and thermal energy storage device monitoring methods are described. According to one aspect, a thermal energy storage device includes a reservoir configured to hold a thermal energy storage medium, a temperature control system configured to adjust a temperature of the thermal energy storage medium, and a state observation system configured to provide information regarding an energy state of the thermal energy storage device at a plurality of different moments in time.

16 Claims, 3 Drawing Sheets

THERMAL ENERGY STORAGE DEVICES, SYSTEMS, AND THERMAL ENERGY STORAGE DEVICE MONITORING METHODS

STATEMENT AS TO RIGHTS TO INVENTIONS MADE UNDER FEDERALLY-SPONSORED RESEARCH AND DEVELOPMENT

This invention was made with Government support under Contract DE-AC0576RLO1830 awarded by the U.S. Department of Energy. The Government has certain rights in the invention.

TECHNICAL FIELD

This disclosure relates to thermal energy storage devices, systems, and thermal energy storage device monitoring methods.

BACKGROUND OF THE DISCLOSURE

Some devices are arranged to increase a temperature of a medium (such as water) above an ambient or normal temperature of the medium and store the medium having the increased temperature. These devices may be referred to as thermal energy storage devices. Some thermal energy storage devices are ubiquitous, such as water heaters, which are utilized in modern housing facilities, commercial establishments and other applications to provide hot water for daily use. While water heaters operate to increase the temperature of water over an ambient temperature of the water, they also store the heated water so the heated water is available for immediate use on demand when needed. These devices receive the medium (e.g., water) in a reservoir, heat the medium, store the medium at an increased temperature, and provide the medium having the increased temperature on demand.

A temperature distribution of a medium in a thermal energy storage device in the form of a water heater typically consists of three regions, hot water in the top region of the reservoir, cold water in a lower region of the reservoir, and a thermocline region between the hot water region and cold water region. The position of the thermocline region corresponds to a boundary of the cold and hot water in the reservoir.

As discussed below, the present disclosure provides apparatus and methods for monitoring and providing information regarding a thermocline region and an energy state of a thermal energy storage device, such as a water heater.

BRIEF DESCRIPTION OF THE DRAWINGS

Exemplary embodiments of the disclosure are described below with reference to the following accompanying drawings.

DETAILED DESCRIPTION OF THE DISCLOSURE

Illustrative embodiments herein disclose example methods and apparatus for monitoring a location of a thermocline region within a thermal energy storage device, such as a water heater. The information regarding the location of the thermocline region may be used to determine an energy state of the thermal energy storage device. For example, the methods and apparatus may indicate the energy state as a "state-of-charge" of the thermal energy storage device in one embodiment as described in additional detail below.

According to one embodiment, a thermal energy storage device comprises a reservoir configured to hold a thermal energy storage medium, a temperature control system configured to adjust a temperature of the thermal energy storage medium, and a state observation system configured to provide information regarding an energy state of the thermal energy storage device at a plurality of different moments in time.

According to an additional embodiment, a system comprises a thermocline location system configured to monitor a plurality of locations of a thermocline region within a thermal energy storage medium of a thermal energy storage device at a plurality of different moments in time and circuitry configured to provide information regarding the locations of the thermocline region within the thermal energy storage medium of the thermal energy storage device at the different moments in time.

According to another embodiment, a thermal energy storage device monitoring method comprises emitting a first signal towards a position indicating object which is located within a thermal energy storage medium of a reservoir of a thermal energy storage device, receiving a second signal as a result of the first signal being reflected by the position indicating object, and using the second signal, providing information regarding the location of a thermocline region within the thermal energy storage medium of the reservoir of the thermal energy storage device.

Figure 1:
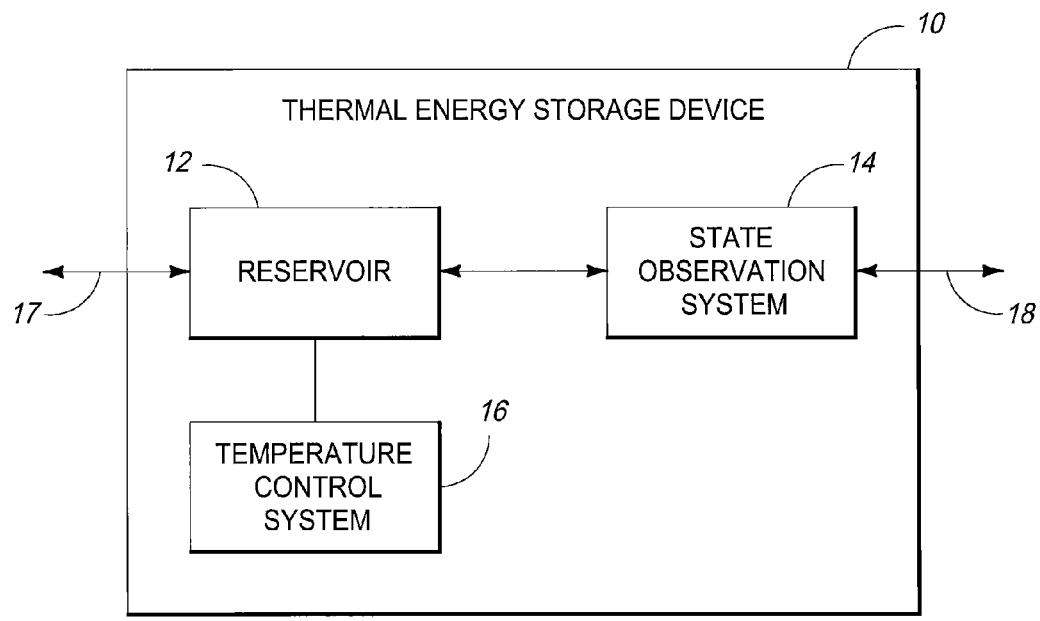
FIG. 1 is a functional block diagram of a thermal energy storage device according to one embodiment.

Referring to FIG. 1, one embodiment of a thermal energy storage device 10 is shown. The illustrated device 10 includes a reservoir 12, a state observation system 14, and a temperature control system 16. The thermal energy storage device 10 may be arranged as a water heater in one example configuration.

A thermal energy storage medium, such as water, may be stored within the reservoir 12 and transferred into and out of the reservoir 12 via one or more pipes 17. For example, in a typical water heater arrangement as described below with respect to FIG. 3, an inlet pipe may deliver low temperature water to the reservoir 12 and an outlet pipe may be used to discharge higher temperature water from the reservoir 12. The temperature control system 16 is configured to adjust the temperature of the medium, and the system 16 of a water heater may include one or more heating element which is configured to increase the temperature of the thermal energy storage medium above the temperature of the water which is received via the inlet.

State observation system 14 monitors the energy state of the thermal energy storage device 10 during operations of the device 10 and provides information regarding the energy state of the device 10 at different moments in time in one embodiment. Additional details regarding the state observation system 14 are described below with respect to an example embodiment of FIGS. 2 and 3.

In one configuration, the state observation system 14 monitors and provides information regarding the energy state of the device 10 as a representation of a current energy state of the device 10 (e.g., amount of energy stored or heat capacity of the thermal energy storage medium at one or more moment in time) versus a maximum energy state of the device 10 (e.g., maximum storage amount of energy or heat capacity of the thermal energy storage medium). In one embodiment described below, the location of the thermocline region between cold and hot regions of the thermal energy storage medium may be monitored at different moments in time and used to provide information regarding the energy state of the device 10 at the different moments in time.

Figure 2:
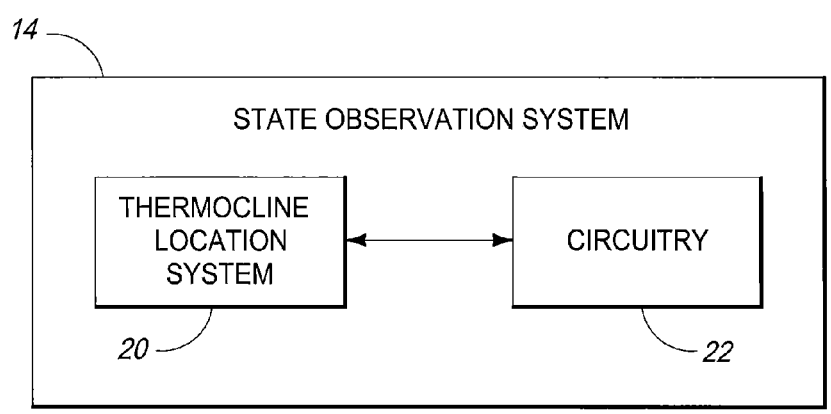
FIG. 2 is a functional block diagram of a state observation system according to one embodiment.

Referring to FIG. 2, one example configuration of a state observation system 14 is shown. The illustrated system 14 includes a thermocline location system 20 and circuitry 22. As mentioned above, the locations of the thermocline region within the thermal energy storage medium may be used to provide information regarding the energy state of the thermal energy storage device 10 at different moments in time.

Thermocline location system 20 is configured to monitor locations of the thermocline region within the medium 32 at different moments in time, and the circuitry 22 uses the monitored locations of the thermocline region to provide information regarding the locations of the thermocline region within the energy storage medium and the energy state of the device 10 at the respective moments in time.

Figure 3:
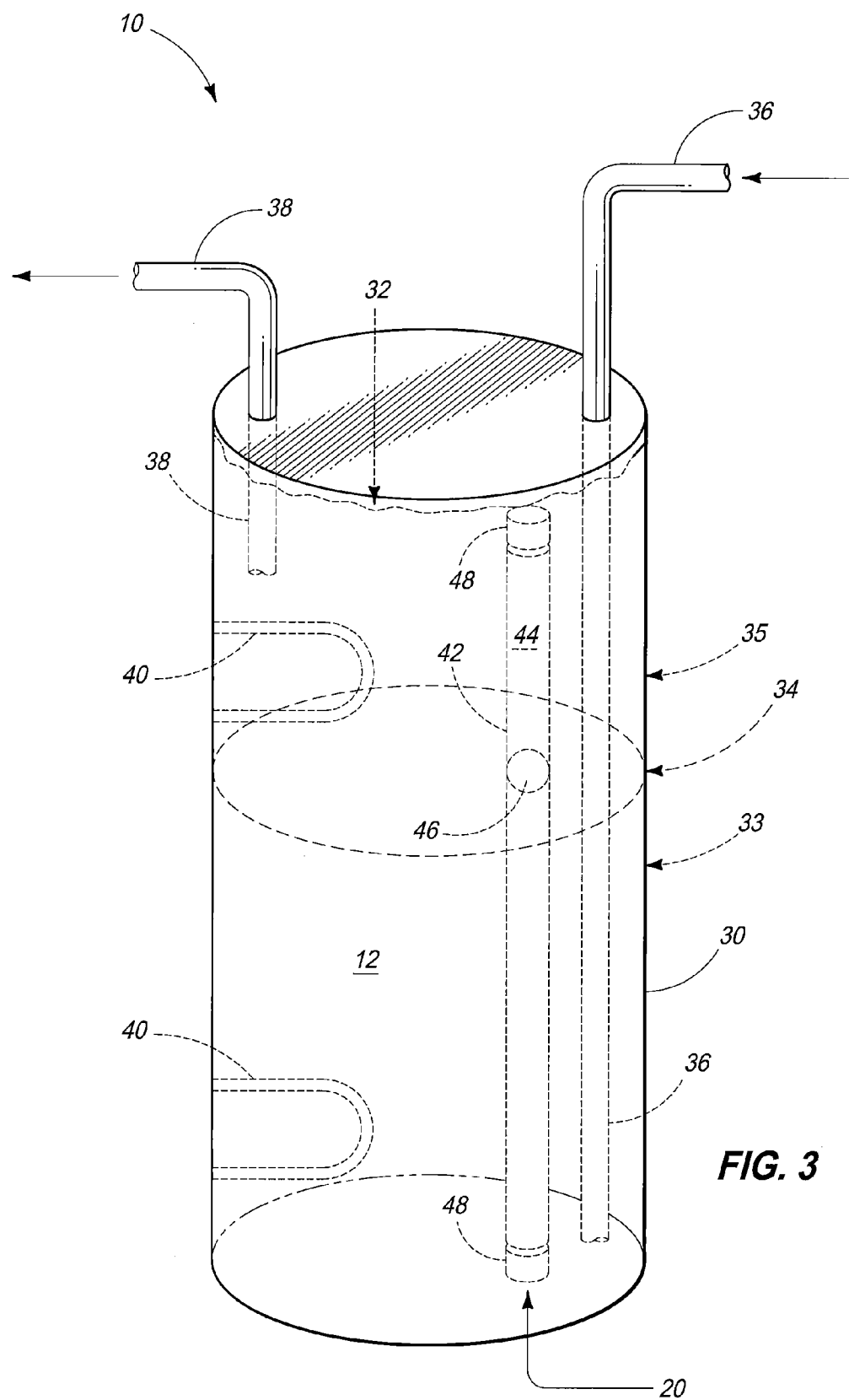
FIG. 3 is an illustrative representation of a water heater according to one embodiment.

Referring to FIG. 3, additional details regarding example embodiments of the thermal energy storage device 10 and thermocline location system 20 are shown. In the depicted example embodiment, the thermal energy storage device 10 is a water heater, although other configurations of device 10 are possible.

The device 10 comprises a tank 30 which includes a reservoir 12 which is configured to receive and hold the thermal energy storage medium 32, such as water. The medium 32 may be received within the reservoir 12 via an inlet pipe 36 which delivers the medium 32 to a lower portion or region of the reservoir 12. The medium 32 may be discharged from an upper portion or region of the reservoir 12 via an outlet pipe 38.

In the described example embodiment, the device 10 includes one or more heating elements 40 (of temperature control system 16 of FIG. 1) which are configured to utilize electrical energy, gas or other energy source to increase the temperature of the medium 32 over the temperature of the water delivered into the reservoir 12 via the inlet pipe 36. For example, water may be introduced into the reservoir 32 at a relatively low normal or ambient temperature, heated by the heating elements 40 to an increased temperature, and the water having the increased temperature may be discharged from the reservoir 12 via outlet pipe 38, for example for use in a residence or commercial establishment.

In the described example embodiment, the portion of the medium 32 present in the lower region 33 of the reservoir 12 may have a lower temperature than the portion of the medium 32 which is present in the upper region 35 of the reservoir 12. In addition, a thermocline region 34 exists at a boundary between the different cold and hot portions of the medium 32 present in the lower and upper regions 33, 35 of the reservoir 12, respectively.

The thermal energy storage device 10 includes thermocline location system 20 which is configured to monitor the locations of the thermocline region 34 within the medium 32 at the different moments in time. For example, as hot water is discharged from the reservoir 12, additional ambient lower temperature water is introduced into the reservoir and the location of the thermocline region 34 raises within the reservoir 12. The replacement of the hot water with the colder water may cause the heating elements 40 to turn on to heat the medium 32 within the reservoir 12 to a desired set point. As the medium 32 is heated within the reservoir 12, the thermocline region 34 lowers within the reservoir 12.

In one embodiment, the thermocline location system 20 monitors the movement of the thermocline region 34 as described in further detail below. The system 20 may be spaced from the heating elements 40 in one example configuration to reduce or minimize the effects of the heating by the elements 40 upon the system 20.

In the depicted example embodiment, the thermocline location system 20 includes a container 42 which is located within the reservoir 12 and includes a fluid 44. The container 42 extends vertically from a bottom of the reservoir 12 to a top of the reservoir 12 in the illustrated embodiment. The container 42 is thermally-conductive (e.g., metallic) and sealed to contain the fluid 44 in one embodiment.

The thermocline location system 20 additionally includes a position indicating object 46 within the container 42 in the depicted embodiment. The location of the object 46 within the container 42 corresponds to the location of the thermocline region 34 and object 46 moves with movement of the thermocline region 34. In the described embodiment, the container 42 is configured to permit the position indicating object 46 to move within the container 42 and through different locations of the reservoir 12 (upward and downward within the reservoir 12) as a result of upward and downward changes in the location of the thermocline region 34 within the medium 32. For example, an appropriate fluid 44 (e.g., alcohol) is utilized in the container 42 whose density varies with temperature changes in one embodiment (e.g., the density of the fluid 44 decreases as the temperature of the fluid 44 increases).

Furthermore, the object 46 is semi-buoyant and has a substantially fixed density with temperature changes in one embodiment. The object 46 may comprise glass, plastic, or magnetic material, and may additionally include an optical reflector in example embodiments. In the described embodiment, the object 46 is free-floating and moves upwards and downwards corresponding to upward and downward changes in the location of the thermocline region 34. As mentioned above, the density of the displaced fluid 44 varies with temperature which results in the movement of object 46 upward or downward corresponding to upward or downward movement of the thermocline region 34 in the thermal energy storage medium 32 in the described example embodiment.

In one embodiment, the specific density parameters of the fluid 44 may be selected based upon the expected temperature of the thermocline region 34. In one water heater embodiment, the desired temperature range (e.g., 100-200 degrees F.) may be lower and higher than a typical set point of the water heater to ensure that the object 46 tracks the temperature changes of the medium 32. As the temperature changes in the medium 32 within the reservoir 12, the density of the fluid 44 changes causing the object 46 to rise or sink corresponding to the changes in the location of the thermocline region 34.

The thermocline location system 20 additionally includes one or more monitoring devices 48 which are configured to monitor the location of the position indicating object 46 (e.g., a vertical location of the object 46 within the reservoir 12) to determine the location of the thermocline region 34 within the medium 32. For example, plural monitoring devices 48 are used in one embodiment and may be provided adjacent to upper and lower ends of the container 42 and the monitoring devices 48 are individually configured to monitor a distance of the object 46 from the respective monitoring device 48. The results of the plural monitoring devices 48 may be averaged to provide location information of increased accuracy compared with arrangements which utilize a single monitoring device 48.

Different configurations of monitoring devices 48 which are configured to monitor distances between the devices 48 and the object 46 may be utilized. For example, the monitoring devices 48 may be individually configured to emit signals and monitor returned signals for return strength, propagation delays, interferometry or other appropriate metric to calculate distances of the object 46 from the respective device 48.

In one example, a monitoring device 48 may be a sonar transceiver configured to emit signals in the form of sound pulses and to sense the return echoes to calculate a distance of the object 46 from the device 48 using time between the signals. In another embodiment, a monitoring device 48 may be an optical transceiver configured to transmit an optical signal and monitor a return strength of a reflected signal of the optical signal to calculate a distance of the object 46 from the device 48.

Other embodiments of monitoring devices 48 are possible. For example, in one other embodiment, monitoring devices 48 may be provided adjacent to sides of container 42 and configured to monitor magnetic fields which may change due to movements of object 46 within the container 42 to provide information regarding the location of the object 46.

The output of the monitoring devices 48 (e.g., time-delay, strength of return signals, etc.) corresponding to the location of the object 46 is indicative of the location of the object 46 and may be provided to circuitry 22 which is configured to utilize the output to provide information regarding the location of the thermocline region 34 within the reservoir 12 and information regarding an energy state of the thermal energy storage device 10.

Figure 4:
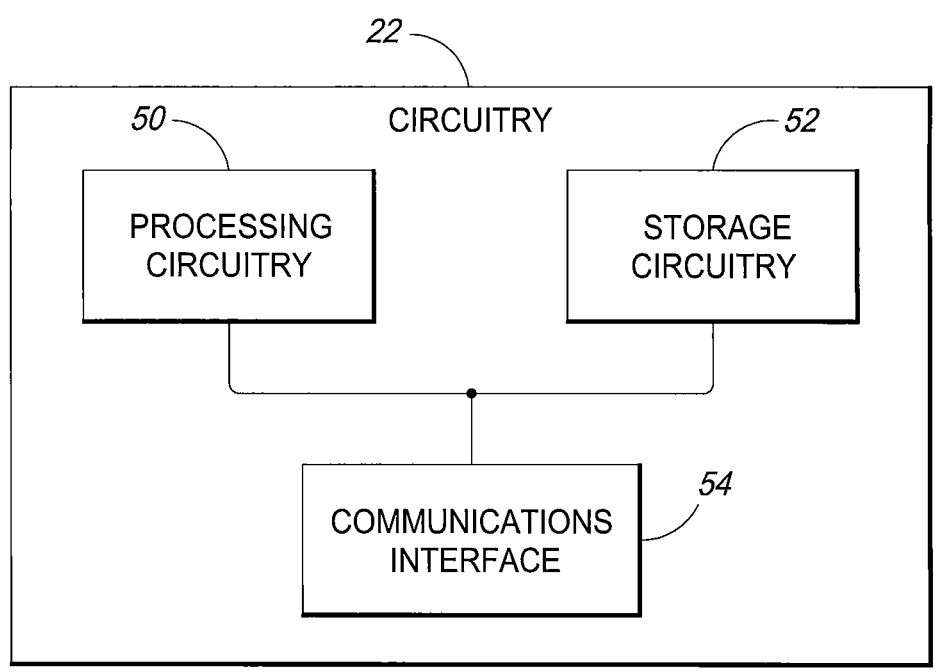
FIG. 4 is a functional block diagram of circuitry according to one embodiment.

Referring to FIG. 4, one example embodiment of circuitry 22 is shown and includes processing circuitry 50, storage circuitry 52 and a communications interface 54. Other embodiments are possible including more, less or alternative circuitry.

In one embodiment, processing circuitry 50 is arranged to process data, control data access and storage, issue commands, and control other desired operations. Processing circuitry 50 may comprise circuitry configured to implement desired programming provided by appropriate computer-readable storage media in at least one embodiment. For example, the processing circuitry 50 may be implemented as one or more processor(s) and/or other structure configured to execute executable instructions including, for example, software and/or firmware instructions. Other exemplary embodiments of processing circuitry 50 include hardware logic, PGA, FPGA, ASIC, state machines, and/or other structures alone or in combination with one or more processor(s). These examples of processing circuitry 50 are for illustration and other configurations are possible.

Storage circuitry 52 is configured to store programming such as executable code or instructions (e.g., software and/or firmware), electronic data, databases, image data, or other digital information and may include computer-readable storage media. At least some embodiments or aspects described herein may be implemented using programming stored within one or more computer-readable storage medium of storage circuitry 52 and configured to control appropriate processing circuitry 50.

The computer-readable storage medium may be embodied in one or more articles of manufacture which can contain, store, or maintain programming, data and/or digital information for use by or in connection with an instruction execution system including processing circuitry 50 in the exemplary embodiment. For example, exemplary computer-readable storage media may include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Communications interface 54 is arranged to implement communications of circuitry 22 with respect to external devices (not shown). For example, communications interface 54 may be arranged to communicate information bi-directionally. Communications interface 54 may be implemented as a network interface card (NIC), serial or parallel connection, USB port, Firewire interface, flash memory interface, or any other suitable arrangement for implementing communications.

In one embodiment, processing circuitry 50 is configured to access the output from the monitoring devices 48 as mentioned above and may utilize the output to provide information regarding the location of the position indicating object 46 which is indicative of the location of the thermocline region 34 within the reservoir 12. If one monitoring device 48 is present, the output of the device 48 may be utilized to provide the information regarding the location of object 46. If plural devices 48 are present, the outputs of the devices 48 may be averaged to provide the information regarding the location of object 46 with increased accuracy. In more specific examples, the processing circuitry 50 may use information regarding time periods between the emission of signals by one or more devices 48 and receipt of return signals reflected by the object 46, or the strength of return signals to provide information regarding the distance of the object 46 from the monitoring device 48 and which is indicative of the location of the thermocline region 34.

Processing circuitry 50 may also utilize the information regarding the location of the object 46 and the thermocline region 34 within the reservoir 12 to control operations of the device 10, such as turning on or off the heating elements 50. Furthermore, the circuitry 50 may utilize the information regarding the location of the object to provide information regarding an energy state of the thermal energy storage device 10. In one embodiment, the processing circuitry 50 is configured to provide the information regarding the energy state of the device 10 as a representation of the amount of energy stored in the medium 32 at one or more moments in time versus a maximum amount of energy which may be stored in the medium 32 and which may be referred to as a state-of-charge of the device 10 at the respective moments in time.

In one embodiment, the thermocline location system 20 may be calibrated to correctly indicate the appropriate state-of-charge of the thermal energy storage device 10. The thermocline location system 20 may be configured in one embodiment such that the location of the object 46 corresponds directly to the location of the thermocline region 34. In another embodiment, the thermocline location system 20 may be provided within the reservoir 12 and the relationship of the location of the object 46 to the state-of-charge of the thermal energy storage device 10 may be empirically derived. For example, the thermal energy storage device 10 may be cycled through different states-of-charge from 0%-100% and the output of the thermocline location system 20 may be measured for each of the different states-ofcharge which provides a mapping of the different states-of-charge of the thermal energy storage device 10 and the output of the thermocline location system 20 in one embodiment. In another embodiment, the locations of the thermocline region 34 (corresponding to different states-of-charge of device 10) may be measured within the reservoir 12 and the output of the thermocline location system 20 may be measured for each of the different locations of the thermocline region 34 which provides a mapping of the different states-of-charge of the thermal energy storage device 10 and the output of the thermocline location system 20. Thereafter, the determined relationship or mapping may be stored within circuitry 52 and utilized to provide information regarding the state-of-charge of the thermal energy storage device 10 corresponding to different measured locations of the object 46 at different moments in time.

The determined energy state of the energy storage device 10 may be used for other purposes in addition to control of temperature adjustment operations by the device 10 with respect to the thermal energy storage medium 32 as mentioned above.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A system comprising:
a thermocline location system configured to monitor a plurality of locations of a thermocline within a thermal energy storage medium of a thermal energy storage device at a plurality of different moments in time;
circuitry coupled with the thermocline location system and configured to provide information regarding the locations of the thermocline within the thermal energy storage medium of the thermal energy storage device at the different moments in time using the monitoring of the locations of the thermocline;
wherein the thermocline location system comprises: a position indicating object configured to move throughout different locations of a reservoir of the thermal energy storage device which holds the thermal energy storage medium as a result of changes in the locations of the thermocline within the thermal energy storage medium; and a monitoring device configured to monitor the locations of the object; and
wherein the circuitry is configured to use the monitored locations of the object to provide the information regarding the locations of the thermocline within the thermal energy storage medium.

2. The system of claim 1 wherein the monitoring device is configured to emit a first signal towards the object, to receive a second signal resulting from a reflection of the first signal from the object, and to monitor the locations of the object using the second signal.

3. The system of claim 1 wherein the thermal energy storage medium is a liquid and the locations of the thermocline are below an uppermost surface of the liquid.

4. The system of claim 1 wherein the monitoring device is an initial monitoring device, and wherein the thermocline location system comprises an additional monitoring device, and the initial monitoring device and the additional monitoring device are positioned at different elevations of the thermal energy storage device.

5. The system of claim 1 wherein the circuitry is configured to use the information regarding the locations of the thermocline to provide information regarding an energy state of the thermal energy storage device at the different moments in time.

6. The system of claim 5 wherein the circuitry is configured to provide the information regarding the energy state of the thermal energy storage device as representations of amounts of energy stored in the thermal energy storage medium at the different moments in time versus a maximum energy storage amount of the thermal energy storage medium.

7. The system of claim 1 wherein the thermocline location system comprises a container located within the reservoir and which comprises a fluid, and wherein the object is configured to move within the container as a result of movement of the thermocline within the thermal energy storage device.

8. The system of claim 7 wherein a density of the fluid within the container varies with changes in temperature and the object has a substantially constant density during the changes in temperature.

9. The system of claim 7 wherein the container is configured to permit the object to move upwardly and downwardly corresponding to the changes in the locations of the thermocline.

10. A thermal energy storage device monitoring method comprising:
emitting a first signal towards a position indicating object which is located within a thermal energy storage medium of a reservoir of a thermal energy storage device;
receiving a second signal as a result of the first signal being reflected by the position indicating object; and
using the second signal, providing information regarding the location of a thermocline region within the thermal energy storage medium of the reservoir of the thermal energy storage device.

11. The method of claim 10 further comprising, using the information regarding the location of the thermocline region, providing information regarding an energy state of the thermal energy storage device.

12. The method of claim 10 further comprising, using the information regarding the location of the thermocline region, providing information regarding a representation of an amount of energy stored in the thermal energy storage medium versus a maximum energy storage amount of the thermal energy storage medium.

13. The method of claim 10 wherein the emitting comprises emitting the first signal towards the position indicating object which is within a container which comprises a fluid and which is provided within the thermal energy storage medium, and the providing comprises providing the information regarding a vertical location of the thermocline region within the thermal energy storage medium within the reservoir of the thermal energy storage device which is a water heater.

14. The method of claim 13 wherein the emitting comprises emitting the first signal into a top of the container, and further comprising:
   emitting a third signal into a bottom of the container; and
   receiving a fourth signal as a result of the third signal being reflected by the position indicating object, and wherein the providing comprises providing using the fourth signal.

15. A system comprising:
   a thermocline location system configured to monitor a plurality of locations of a thermocline within a thermal energy storage medium of a thermal energy storage device at a plurality of different moments in time;
   circuitry coupled with the thermocline location system and configured to provide information regarding the locations of the thermocline within the thermal energy storage medium of the thermal energy storage device at the different moments in time using the monitoring of the locations of the thermocline; and
   wherein the circuitry is configured to use the information regarding the locations of the thermocline to provide information regarding an energy state of the thermal energy storage device at the different moments in time.

16. The system of claim 15 wherein the circuitry is configured to provide the information regarding the energy state of the thermal energy storage device as representations of amounts of energy stored in the thermal energy storage medium at the different moments in time versus a maximum energy storage amount of the thermal energy storage medium.

* * * * *